July 16, 1935.  H. A. TOBELMANN  2,008,373
PRECIPITATING COPPER FROM SOLUTIONS
Filed July 30, 1932
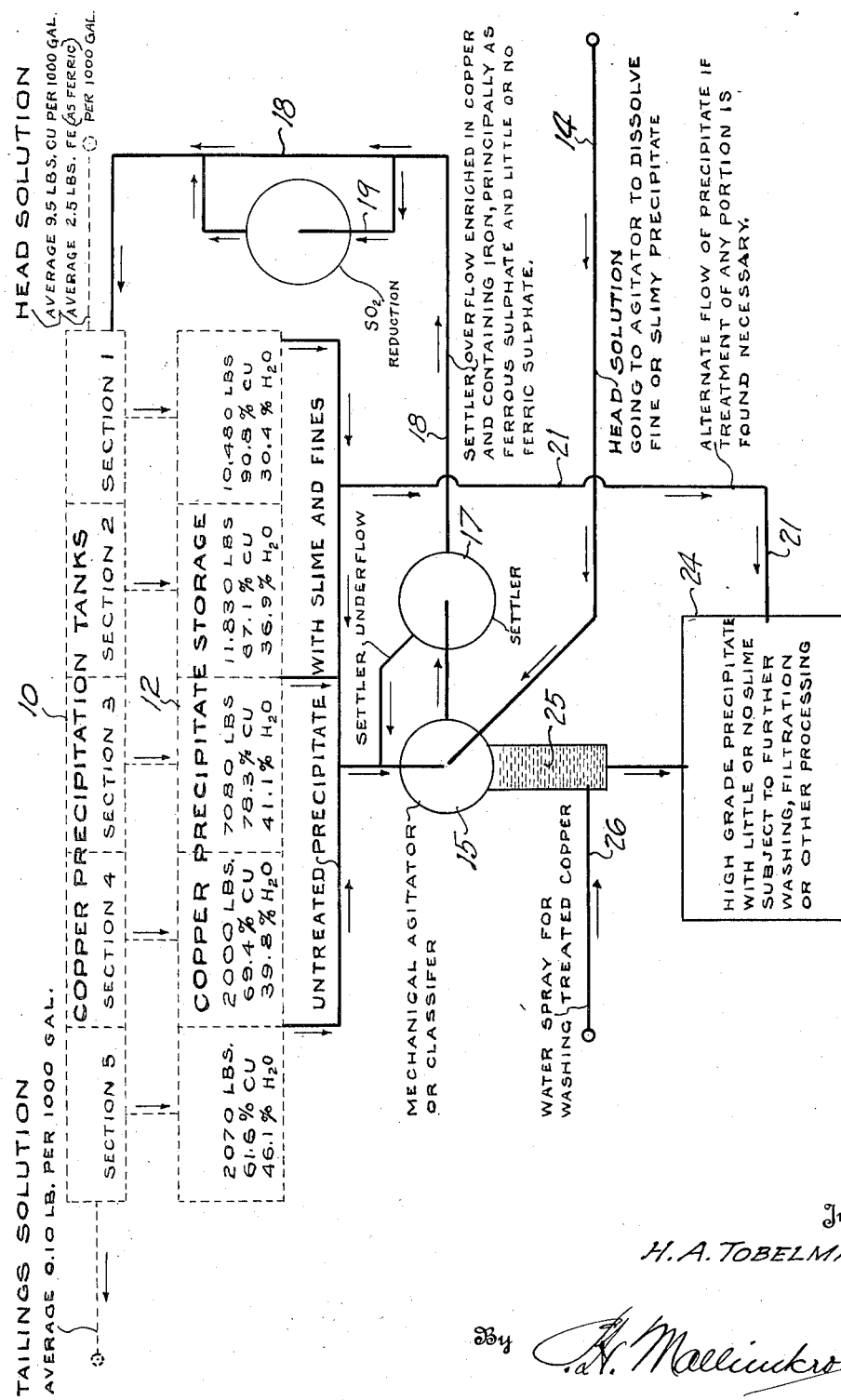
Inventor
H. A. TOBELMANN,
By
Attorney Patented July 16, 1935

2,008,373

UNITED STATES PATENT OFFICE 2,008,373

PRECIPITATING COPPER FROM SOLUTIONS

Henry A. Tobelmann, Salt Lake City, Utah

Application July 30, 1932, Serial No. 626,781

6 Claims. (Cl. 75—18)

This invention relates to a process of precipitating copper from solutions obtained by the lixiviation of ores, or otherwise, by precipitation on metallic iron.

The practice of this invention consists in the operation and sequences of operations set forth in this specification, and the features for which protection of Letters Patent of the United States is desired, are collectively grouped in the claims concluding this specification.

The drawing, consisting of a single figure, illustrates in diagrammatic form, plant apparatus by means of which the process is carried into practice.

I have observed that copper solutions resulting from lixiviation operations, also contain other elements and/or compounds, such as iron, alumina, lime, magnesia, silica, acids, etc. In nearly all cases, iron is present in such solutions in both the bivalent and trivalent forms. The trivalent form is a ready solvent of metallic copper and metallic iron. The product obtained when subjecting solutions resulting from the lixiviation of copper ores or otherwise to the action of metallic iron, is generally designated in the art, as cement copper.

The cement copper so obtained, consists of individual particles of copper largely in the metallic form, together with various impurities in a more or less finely divided state.

As the solution becomes impoverished in copper, I have observed that there is a gradual diminution in both the quantity and the quality of the cement copper precipitated. Furthermore, as the quality or grade of the cement copper becomes poorer, the amount of copper present in a slimy or colloidal form, increases. The finely divided portion includes more or less of the impurities present in the solution. However, all cement copper invariably contains more or less finely divided material which carries a large part of the impurities. The proportion of this fine material increases as the copper content of the solution is diminished.

It is well known that the greater the proportion of fines in cement copper, the more difficult it is to dry. For example, clean cement copper analyzing 95% copper, when drained, generally has a low moisture content, such as 20%. On the other hand, cement copper of lower grade contains much more moisture; for example, cement copper analyzing 60% copper contains 45 or 50% moisture.

After careful investigation, I find that much of the objectionable, slimy or extremely colloidal portion of the cement copper may be removed by subjecting all or a part of the precipitate, in a mechanical agitator of one kind or another, with a suitable solution derived from leaching or other operations, and containing ferric or trivalent iron. The solution will hence forth be referred to herein as the "head solution".

The activity of the head solution as a solvent of copper is largely dependent on the trivalent iron, for example, in the case of a sulphate solution, ferric sulphate that may be present according to the reaction:

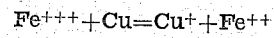

$$Fe^{+++} + Cu = Cu^+ + Fe^{++}$$

By proper manipulation, only the finer and more impure portions of the precipitate will be dissolved, resulting in a proportional reduction of the ferric ion to the ferrous. This enriched and simultaneously reduced, or partly reduced, solution from the agitator, is readily separated from the undissolved or coarser parts of the precipitate, and is then delivered to the head of the precipitation plant where the dissolved copper is recovered according to the following reaction:

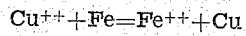

$$Cu^{++} + Fe = Fe^{++} + Cu$$

The impurities present as a part of the fine precipitate, such as metallic iron, silica, etc., will either be dissolved or carried away by the natural flow of the solution, as determined by the usual method of operation. In cases where the fine portion of the precipitate is not sufficient to cause complete reduction of the ferric ion in the solution, one of the simple and well known reduction expedients may be employed, such as treatment with sulphur dioxide. The complete reduction of the ferric ion in the head solution, to ferrous, by either or both of these methods, will mean a saving in the poundage of iron consumed per lb. of copper precipitated, and thus, the objectionable ferric ion, in whatever quantity it may occur in the head solution, is directed to the useful purpose of dissolving the lower grade cement copper.

The drawing illustrates what has just been explained. Referring to the drawing, the portions 10 and 12, indicated in broken lines, represent the apparatus usually used in the simple process of precipitating copper from solution as generally carried on heretofore.

The portion 10 denotes the customary copper precipitation tanks, which consist of a plurality of successive sections with the head solution entering at one end and the waste or tailing solution leaving at the other end, while 12 denotes the customary copper precipitate storage tanks, which latter have sections corresponding to the sections of the precipitation tank. The data appearing in the storage tank sections of the drawing, denote quantities of precipitate and the percentages of the respective copper and moisture contents as taken from an actual case in practice, the copper content noted, being naturally based on the dried sample. This is for purposes of illustration only.

The portions of the drawing shown in full lines, indicate a typical installation of the apparatus that may be added to an ordinary precipitation plant in order to achieve the benefits of my improved process. It is of course understood that the data shown in the successive sections of storage tank 12, will be materially changed by the operation of my process.

In my process, the usual head solution containing among other substances, ferric or trivalent iron, is delivered through a conductor 14 to a mechanical agitator or classifier 15, where it meets the poorer grade of precipitated or cement copper, which has been transferred through conductor 16 from the copper precipitate storage 12 to the mechanical agitator 15 where the ferric ion in the head solution, quickly dissolves the finely divided metallic copper and metallic iron present in the precipitate, thereby reducing the ferric ion to ferrous. The solution from agitator 15 is taken to a suitable device for settling the heavier particles, such as a settler or thickener 17, from where the enriched solution with little or no ferric ion and little or no metallic copper, is taken through a conductor 18 to the head of the copper precipitation plant where the copper is precipitated under the usual conditions.

Under certain conditions of operation, it may be found desirable to resort to sulphur dioxide or some other reducing agent in order to assure complete reduction of the ferric ion, particularly when for one reason or another, the quantity of ferric ion present in the head solution is in excess of the quantity of copper it is desired to dissolve. In the latter case, the solution passing from the settler 17 in conductor 18, may be by-passed through a conductor 19 leading to a sulphur dioxide or other suitable reduction plant.

In case any of the precipitate from the head end of the storage 12, is sufficiently high grade to make treatment unnecessary, it may be taken through a conductor 21 directly to container 24 for final disposition or other processing.

The cement copper, from which the fine portion has been dissolved in the agitator 15, is washed by a spray of water 25, and delivered into container 24 through a conductor 26.

Having fully described my invention, what I claim is:

1. The method of purifying cement copper consisting in separating the fine portion from the coarse portion, redissolving the copper in the fine portion by means of a ferric salt and passing the redissolved portion back to the head of the precipitation system for reprecipitation.

2. A process for precipitating copper from solutions containing iron in the ferric or trivalent state, including the step which consists in passing the head solution through a series of successive containers containing metallic iron, to form a precipitate, conducting the low grade portion of the precipitate from said containers into a mechanical agitator, and redissolving the fine portion of the said precipitate by means of the head solution.

3. Precipitating copper from solution, including the cycle which consists in subjecting a head solution to contact with metallic iron, and redissolving the fine or slimy portion of the resulting copper precipitate by means of the head solution before the head solution contacts the said metallic iron.

4. In a precipitation system a process for increasing the copper content of cement copper or impure metallic copper precipitate, including the cycle which consists in subjecting the said impure precipitate to the action of a solution containing iron in the trivalent or ferric state, thereby dissolving all or a part of the fine metallic portion of the precipitate, and returning the now enriched copper solution to the head of the precipitation system.

5. A process for purifying cement copper or impure metallic copper precipitate occurring in a precipitation system, including the step which consists in subjecting the said impure precipitate to the action of a solution containing iron in the trivalent or ferric state, thereby dissolving the fine portion of the said impure precipitate, and returning the now enriched copper solution to the head of the precipitation system.

6. In a precipitation system, a process for decreasing the tendency of cement copper to oxidize, including the cyclic step which consists in subjecting the whole or part of an impure copper precipitate to the action of a solution containing iron in the trivalent or ferric state, thereby removing by dissolution part or all of the very fine or slimy portion of the said impure precipitate, which portion has the greatest tendency to oxidize, and returning the enriched solution to the head of the precipitation system.

HENRY A. TOBELMANN.